April 24, 1956 H. L. BOWDITCH 2,742,917
PNEUMATICALLY OPERATED CONTROLLER
Filed Nov. 15, 1952 6 Sheets-Sheet 1

INVENTOR
Hoel L. Bowditch
BY
Curtis, Morris & Safford
ATTORNEYS

April 24, 1956 H. L. BOWDITCH 2,742,917
PNEUMATICALLY OPERATED CONTROLLER
Filed Nov. 15, 1952 6 Sheets-Sheet 3

INVENTOR
Hoel L. Bowditch
BY
Curtis, Morris + Salford
ATTORNEYS

April 24, 1956 — H. L. BOWDITCH — 2,742,917
PNEUMATICALLY OPERATED CONTROLLER
Filed Nov. 15, 1952 — 6 Sheets-Sheet 4
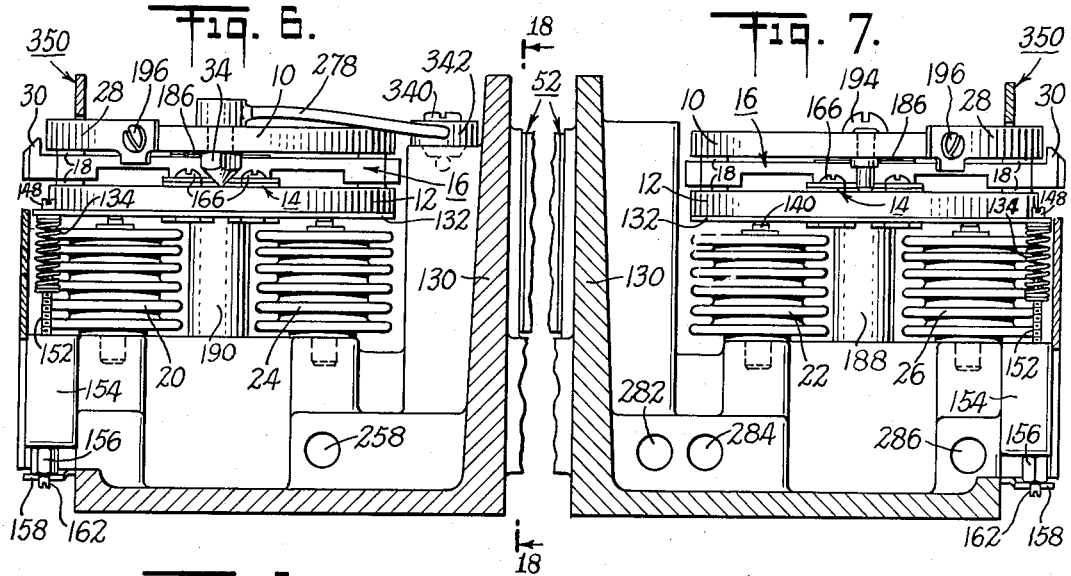
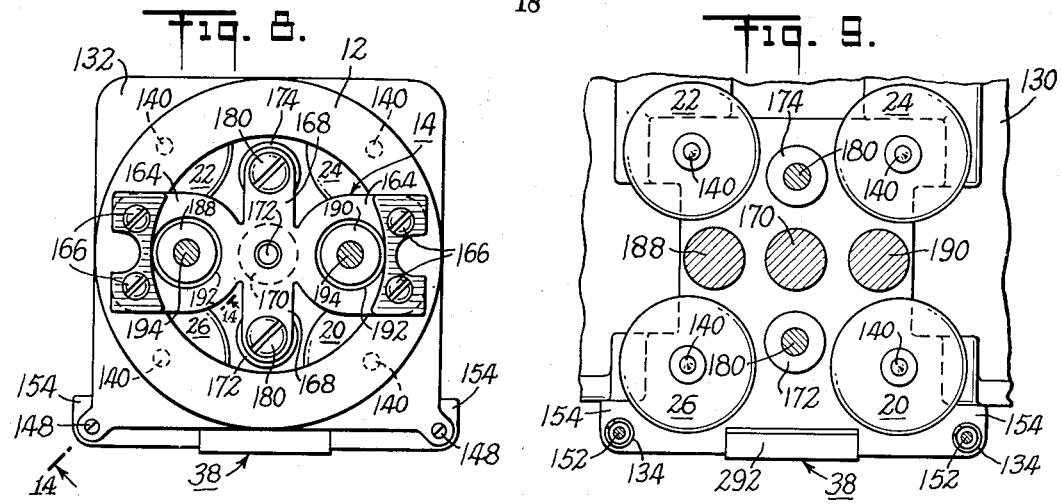
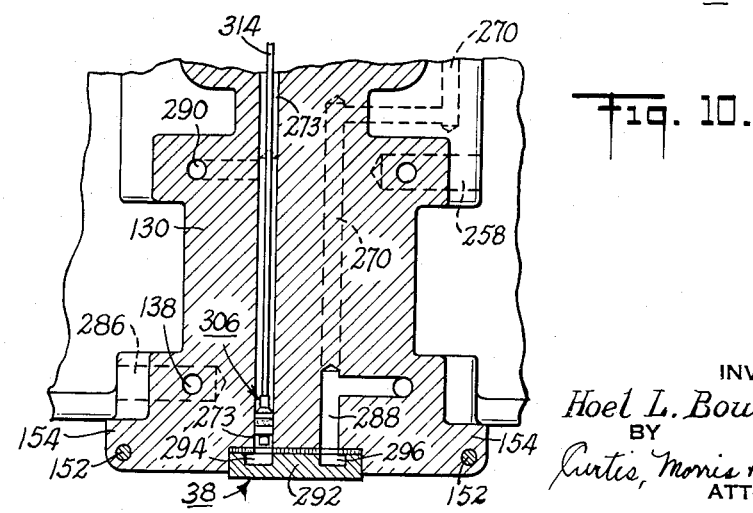
INVENTOR
Hoel L. Bowditch
BY
Curtis, Morris & Safford
ATTORNEYS

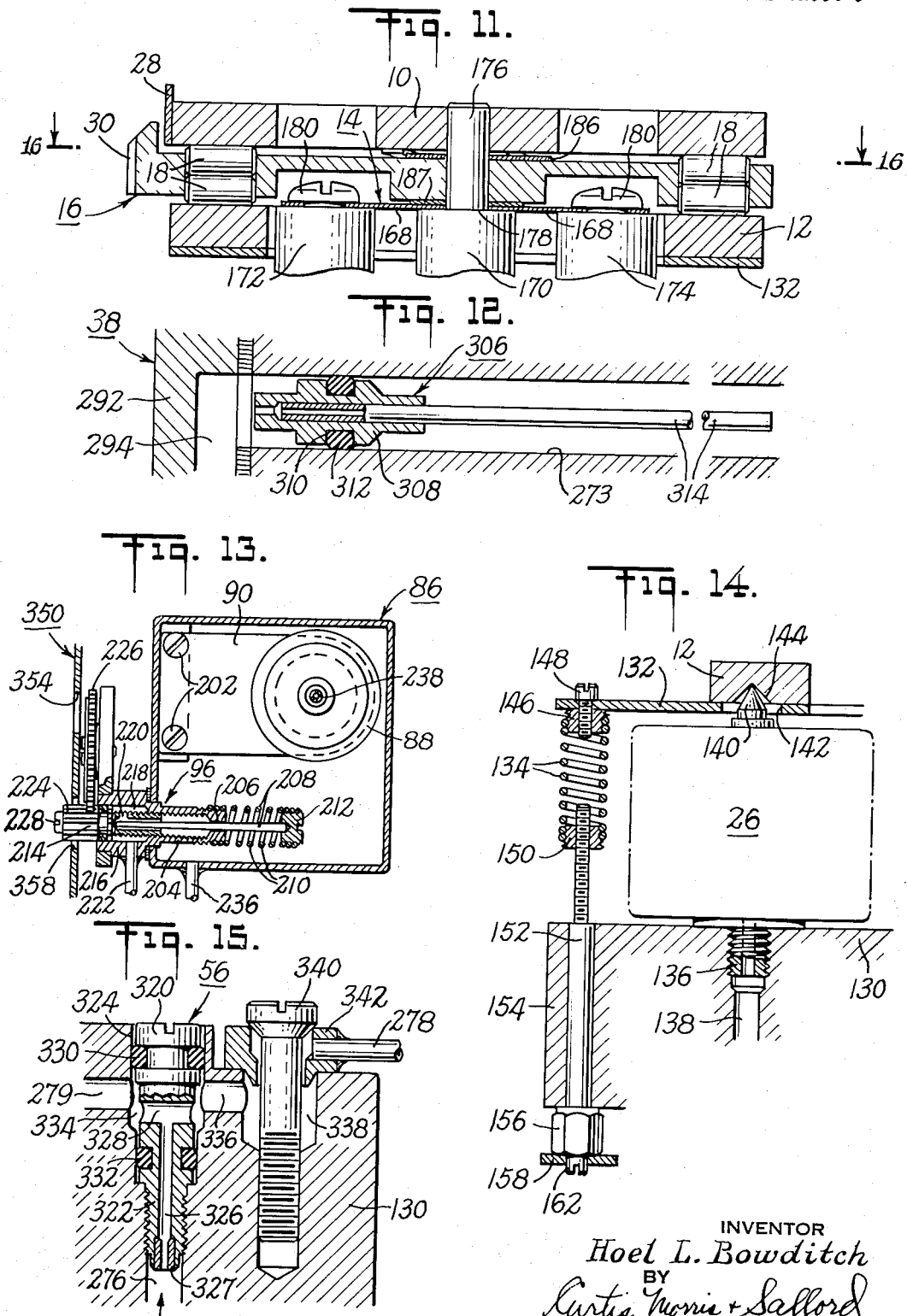

April 24, 1956     H. L. BOWDITCH     2,742,917
PNEUMATICALLY OPERATED CONTROLLER
Filed Nov. 15, 1952     6 Sheets-Sheet 6
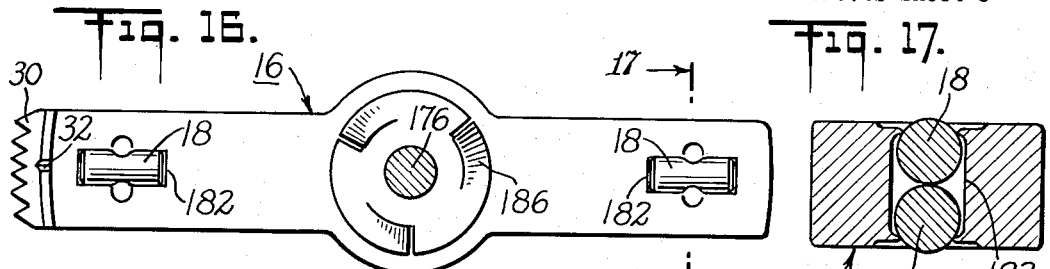
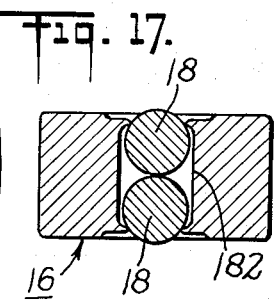
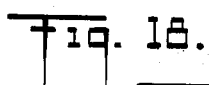
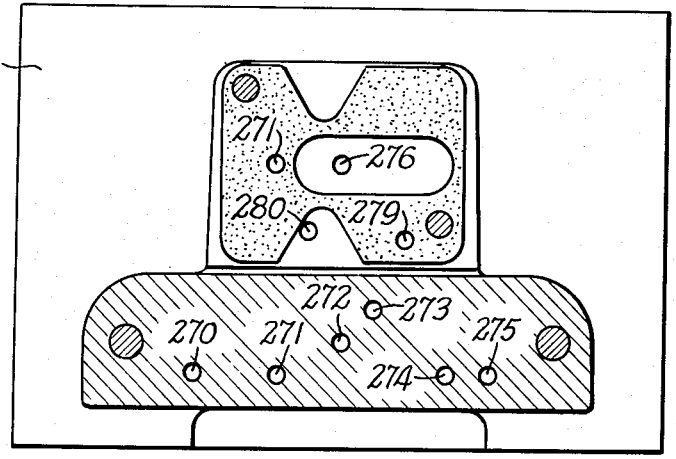
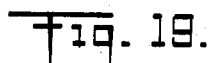
INVENTOR
Hoel L. Bowditch
BY
Curtis, Morris + Safford
ATTORNEYS

United States Patent Office 2,742,917
Patented Apr. 24, 1956

2,742,917

PNEUMATICALLY OPERATED CONTROLLER

Hoel L. Bowditch, Foxboro, Mass., assignor to The Foxboro Company, Foxboro, Mass., a corporation of Massachusetts Application November 15, 1952, Serial No. 320,754

36 Claims. (Cl. 137—86)

This application is concerned with pneumatically operated industrial controllers of the type used to maintain at a desired value variable conditions such as fluid flow, temperature, pressure, liquid level and the like. A controller of this general type is disclosed in the Mason Patent 2,476,104.

As pointed out in Mason Patent 2,476,104, different types of industrial processes require different types of control action, and a general purpose controller should be so constructed as to be capable of providing each of several types of control action. For example, such general purpose controllers are commonly constructed to provide proportioning action, floating or reset action, derivative action and various combinations thereof. While certain of the pneumatic controllers previously available have been sufficiently versatile in their ability to provide the several different types of control action required to control a wide variety of industrial processes, they have been subject to a number of shortcomings in other respects. Thus operational versatility has been achieved in general by utilizing relatively complicated structures having a large number of parts. Also in the prior controllers modification of the structure to change from one type of control action to another has been relatively inconvenient.

A further difficulty that has been encountered with respect to prior controllers is their sensitivity to shock. It has been found that particularly in the case of those instruments incorporating an axially aligned group of metal bellows jarring and vibration of the instrument casing displaces the parts to such an extent as to produce a significant upset in the control action of the instrument. For example, in the case of processes wherein it is important that a controlled variable be maintained very close to a specified value, it has been found that a too vigorous closing of the door of the instrument casing may undesirably upset the control action of the instrument.

It is accordingly an object of the present invention to provide a pneumatic controller capable of overcoming the short-comings of prior controllers outlined above. It is another object of the invention to provide a general purpose pneumatic controller that not only provides the different types of control action ordinarily required but is also exceptionally simple in construction. It is still another object of the invention to provide a controller that can be more readily converted from one type of control action to another than the controllers previously available. It is a still further object of the invention to provide a controller having improved shock resistance and which can withstand considerable jarring without significant upset of the control action. It is a still further object of the invention to provide a controller that is more stable with respect to variations in the ambient temperature than controllers previously available. It is another object of the invention to provide a force balance controller utilizing metal bellows, which are more durable than the stacked diaphragms used in prior controllers of this type. Other objects of the invention will be in part apparent and in part pointed out hereafter.

The many objects and advantages of the present invention may best be understood and appreciated by reference to the accompanying drawings which illustrate a pneumatic controller incorporating a preferred embodiment and also a modification thereof and wherein:

Figure 6 is a vertical section taken on the line 6—6 of Figure 4 and showing, in elevation, the righthand side of the central portion of the controller;

Figure 7 is a vertical section taken on the line 7—7 of Figure 4 and showing, in elevation, the lefthand side of the central portion of the controller;

Figure 8 is a horizontal section taken on the line 8—8 of Figure 4 and particularly showing the flexure that supports the balance plate;

Figure 9 is a horizontal section taken on the line 9—9 of Figure 4, i. e. at a somewhat lower level than Fig. 8, and showing the posts that support the thrust plate and balance plate;

Figure 10 is a horizontal section taken on the line 10—10 of Figure 4, i. e. at a lower level than Fig. 9, and showing certain of the pneumatic passages within the main supporting frame of the controller;

Figure 11 is an enlarged, fragmentary vertical axial section taken on the line 11—11 of Figure 4 and further showing the structure that supports the thrust plate and balance plate;

Figure 12 is an enlarged, fragmentary vertical section through the set-point pressure passage of the main frame taken on the line 12—12 of Figure 4 and showing the location and construction of the resistance in this passage.

Figure 13 is a vertical section through the center of the derivative tank taken on the line 13—13 of Figure 4 and particularly showing the construction of a variable restrictor valve that is associated with the derivative tank;

Figure 14 is a fragmentary vertical section taken along the line 14—14 of Figure 8, i. e., at the axis of one of the bellows, and showing details of the mounting of the bellows and one of the adjusting springs for adjusting the relationship between the bellows;

Figure 15 is an enlarged fragmentary vertical section taken on the line 15—15 of Figure 5 and showing certain details of the connections between the pneumatic relay and nozzle;

Figure 16 is an enlarged top plan view of the rotatable fulcrum;

Figure 17 is a vertical section taken through the fulcrum at the line 17—17 of Figure 16;

Figure 18 is a rear view of the controller with the rear closure members removed to show various ports leading to pneumatic passages within the controller;

Figure 19 is a rear perspective phantom view of the controller and more particularly of the main frame or casting thereof showing the various pneumatic passages that are formed within the frame.

Summary description of controller

Figure 1:
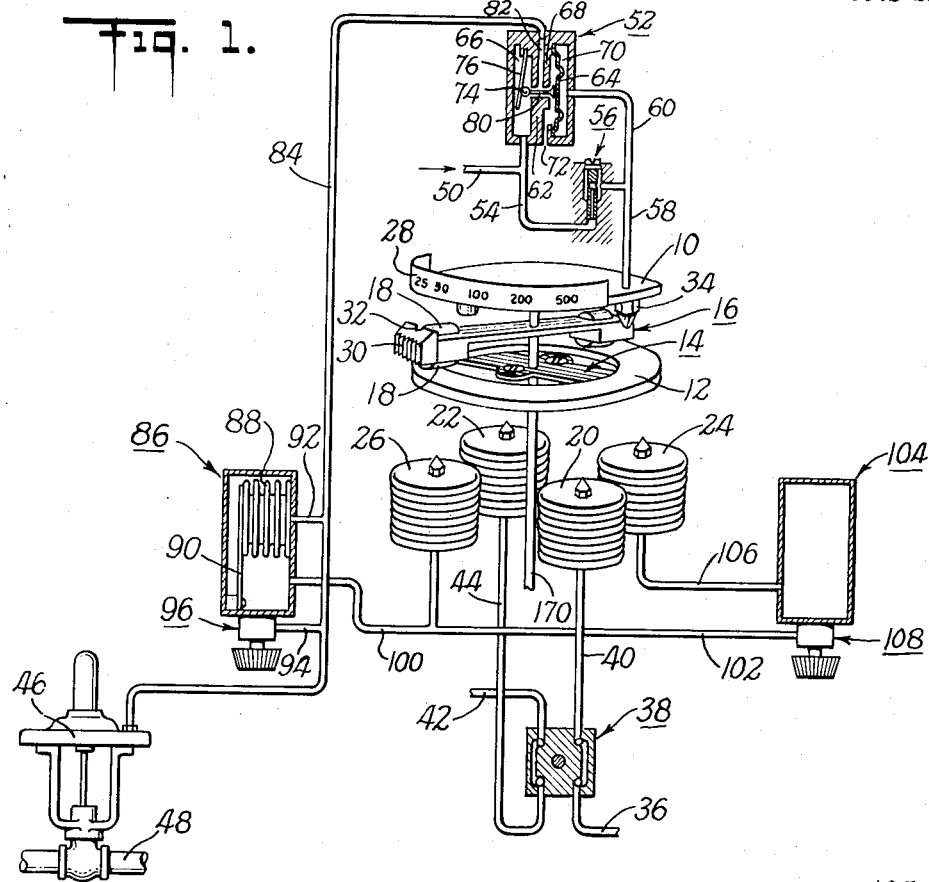
Figure 1 is an exploded, diagrammatic, perspective view of the balance plate assembly, and also shows diagrammatically the pneumatic system of the controller.

Referring to Figure 1 of the drawing, the central portion of the controller comprises a fixed thrust plate 10 and an annular balance plate 12 mounted by means of a flexure 14 for universal tilting movement with respect to the thrust plate 10. Interposed between the thrust plate 10 and balance plate 12 there is a fulcrum 16 rotatable in a plane parallel to the thrust and balance plates having rollers 18 that engage the bottom of thrust plate 10 and the top of balance plate 12 in such manner as to provide an adjustable axis around which the balance plate can tilt with respect to the thrust plate.

Bearing against the under side of balance plate 12 are four expansible metal bellows 20, 22, 24 and 26, each of which is responsive to a different pneumatic pressure. Each of the bellows exerts on balance plate 12, a force proportional to the pneumatic pressure therein and when these forces are unbalanced there is a tendency for the plate 12 to tilt. The bearing points of the bellows 20 and 22 on plate 12 are located on opposite sides of the axis of fulcrum 16, and are equidistant therefrom and remain equidistant therefrom when the fulcrum 16 is rotated throughout its operative range of movement, which is about 90°. Similarly the bearing points of bellows 24 and 26 on plate 12 are located on opposite sides of the axis of fulcrum 16 and remain equidistant from the fulcrum axis as the fulcrum is rotated.

Mounted on the thrust plate 10 there is a curved scale 28 calibrated in terms of proportioning band. The front end of fulcrum 16 has an index block 30 provided with a notch 32 that cooperates with scale 28 to indicate the proportioning band for which the instrument is set. As indicated by the scale 28, the fulcrum 16 is rotatable through an angle of about 90° to give a proportioning band variation of zero (open-shut operation) to infinity.

Also mounted on the thrust plate 10 there is a nozzle 34 the discharge end of which is positioned close to the top of balance plate 12. The nozzle is supplied with air under pressure in a manner presently to be described, and the plate 12, as it is tilted in response to the resultant force exerted by bellows 20—26, acts as a baffle to vary the air flow from the discharge end of the nozzle.

In the present embodiment the bellows 20 and 22 are responsive to controlled pneumatic pressures that are received from points outside the instrument. Thus the bellows 20 is responsive to a pressure proportional to the value of the controlled variable such as fluid flow, pressure, temperature and the like. The air supplied to bellows 20 may come, for example, from a conventional pressure transmitter located near the point where the value of the controlled variable is being measured. The output pressure of such a transmitter may be conducted to the interior of bellows 20 through a pipe 36, a pneumatic reversing switch 38 (to be described in detail hereafter) and a pipe 40. Thus the bellows 20 exerts on balance plate 12 a force proportional to the value of the variable condition being controlled.

The bellows 22 is made responsive to a pneumatic pressure proportional to the set point of the controller, i. e., the value at which the controlled variable is to be maintained. The set point pressure is conducted to bellows 22 through a pipe 42, pneumatic switch 38 and a pipe 44. Thus the bellows 22 exerts on balance plate 12 a force proportional to the set point of the controller.

The difference between the pressure in bellows 20 and that in bellows 22 represents the departure of the controlled variable from the desired value, and the controller, in response to this pressure difference, produces a valve-actuating pneumatic pressure that is conducted to a pneumatically-operated regulating valve 46 (see lower left hand portion of Fig. 1) which is located in a pipe 48 and regulates the flow through pipe 48 of a fluid affecting the controlled variable. For example, if the controlled variable is the temperature of an oil-fired furnace the pipe 48 may be the oil supply pipe to the furnace.

Referring to the upper portion of Fig. 1, air under pressure from a suitable source (not shown) is supplied through a pipe 50 to a conventional pneumatic relay 52. A portion of the supply air flows through a pipe 54, restriction 56 and pipe 58 to the nozzle 34. The relay 52 is connected by a pipe 60 with the nozzle 34.

The relay 52 is internally divided by a partition 62 and resilient diaphragm 64 into three chambers, 66, 68 and 70. The chamber 66 is maintained at the supply pressure. The chamber 68 communicates through a passage 72 with the atmosphere and is thus maintained at atmosphere pressure. Chamber 70 communicates directly with nozzle 34 and its pressure varies as the balance plate approaches and recedes from the discharge end of the nozzle. Extending through a passage 80 in the partition 62, there is a supply and waste valve member 74 that is secured to diaphragm 64 and is urged to the right by a spring 76. Within the partition 62 there is a discharge passage 82 that communicates with the center of valve passage 80. Variations in pressure in chamber 70, i. e., the nozzle back pressure, cause diaphragm 64 to move valve member 74 to vary the pressure in discharge passage 82.

The discharge pressure of the relay 52, which is the regulating valve actuating pressure of the controller, is conducted through pipe 84 to the regulating valve 46 and also to a derivative tank 86 which contains a metal bellows 88 that is urged to the right by a leaf spring 90. The relay discharge pressure is conducted from pipe 84 through a branch pipe 92 to the interior of the bellows 88 and also through a branch pipe 94 and a variable restrictor valve 96 to the interior of the derivative tank 86 outside the bellows 88.

The pressure within the derivative tank 86 outside bellows 88 is conducted through pipe 100 to the interior of bellows 26, and through pipe 102 to a re-set tank 104 which communicates through pipe 106 with the interior of bellows 24. A variable restrictor 108 similar to the restrictor 96 is interposed between pipe 102 and the interior of re-set tank 104.

The operation of the pneumatic system just described is generally similar to that described in Mason Patent 2,476,104. The restrictor 96 is initially set to have a relatively low resistance and the restrictor 108 is set to provide a relatively high resistance. The relationship between nozzle 34 and balance plate 12 is such that a very small movement of the balance plate relative to the nozzle, say .001", is sufficient to change the pressure back of the nozzle from the minimum to the maximum value of its working range, or vice versa. The nozzle 34, plate 12, relay 52, derivative tank 86 and bellows 26 cooperate to maintain the balance plate within this very small operative range, that is to say, these parts maintain the pressure within bellows 26 at whatever value is necessary to keep balance plate 12 and nozzle 34 in operative relation.

Figure 2:
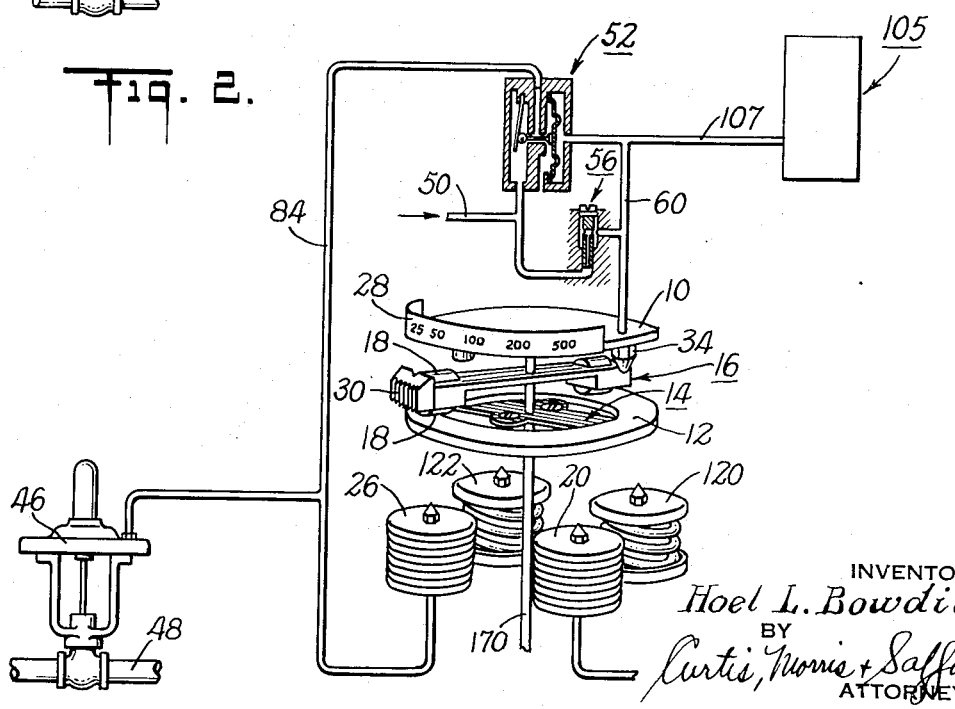
Figure 2 is a view similar to Figure 1 of a modified form of the present invention wherein only two bellows are used instead of the four bellows used in Figure 1.

The derivative tank 86 operates to produce a momentary relatively large increase (or decrease) in the valve-actuating pressure. The operation of the derivative tank can be most conveniently explained by considering first the operation of the controller as a proportioning controller, that is, with the relay output connected directly to bellows 26 as shown in Fig. 2. Assuming a pressure increase in pipe 40, this pressure increase causes relay 52 to produce a corresponding increase in pipe 84 that is transmitted to regulating valve 46 and also the interior of bellows 26. The pressure increase in bellows 26 counterbalances the pressure increase in bellows 20, and the net effect is a moderate increase in regulating valve pressure that is proportional to the change in pressure in pipe 40 and bellows 20.

When derivative tank 86 is in circuit a different effect occurs. The pressure increase in pipe 84 is transmitted to the interior of bellows 88, causing the bellows to expand and increase the pressure in the interiors of tank 86 and bellows 26. However because of spring 90 (and also the spring characteristic of bellows 88) the pressure initially established in tank 86 and bellows 26 is less than the pressure in pipe 84. Hence the counterbalancing force exerted by bellows 26 is less than it would be with the simple proportioning action described above, and the pressure in pipe 84 reaches a higher value, for a given pressure increase in pipe 40, than it would if no tank 86 were used.

The increase in pressure in pipe 84 also causes air to flow through restrictor valve 96 into the interior of derivative tank 86 until the pressures inside and outside bellows 88 equalize. The resulting pressure increase in bellows 26 causes relay 52 to decrease the pressure in pipe 84 to the value it would have in the simple proportioning operation described above. The resistance of restrictor 96 is preferably made smaller than that of restrictor 108, and equalization of the pressures in tank 86 and bellows 88 occurs sooner than in tank 104.

The pressure increase in derivative tank 86 is conducted through pipe 102 to restrictor 108 and produces a relatively slow increase in pressure in re-set tank 104 that is communicated to the interior of bellows 24, thereby providing the floating action described in Mason Patent 2,476,104.

As pointed out previously, the bearing points of bellows 20 and 22 on plate 12 are equidistant from the axis of fulcrum 16, as are the bearing points of bellows 24 and 26. When the fulcrum is positioned with its axis parallel to a line connecting the centers of bellows 22 and 26 (100% proportioning band) the moment arms of the four bellows with respect to the axis are equal. If, under these circumstances, the measured condition departs from the set point a first pressure difference is established between bellows 20 and 22, and the pneumatic system of the instrument operates to establish between bellows 24 and bellows 26 a second pressure difference that is equal to the first pressure difference and counterbalances the tendency of the first pressure difference to tilt plate 12. If the fulcrum 16 is rotated to move its axis toward alignment with bellows 24 and 26, the moment arms of bellows 20 and 22 increase equally, the moment arms of bellows 24 and 26 decrease equally, and the second pressure difference becomes greater than the first pressure difference. If the fulcrum axis is moved toward alignment with bellows 20 and 22, the second pressure difference becomes less than the first pressure difference. The ratio of the first pressure difference to the second pressure difference, expressed as a percentage, is the proportioning band of the controller.

Referring now to Figure 2 of the drawings, a modification of the structure of Figure 1 is shown which is generally similar to that of Figure 1 except that the derivative and reset tanks are omitted and bellows 24 and 22 are replaced by adjustable springs 120 and 122, respectively. Bellows 20 is responsive to a pressure corresponding with the value of the measured variable condition as before and bellows 26 is directly responsive to the relay output pressure. If desired the pneumatic setting feature of Figure 1 can be incorporated in the Figure 2 embodiment by replacing spring 122 of Figure 2 by a bellows such as the bellows 22 of Figure 1, and making the bellows responsive to a pneumatic pressure representative of the set point of the controller. The structure of Figure 2 provides proportioning action only.

As shown in Figure 2 it is desirable in this embodiment to provide additional capacity in the nozzle system. Thus a capacity tank 105 is connected by a pipe 107 with the pipe 60 that interconnects nozzle 34 and relay 52. The capacity 105 improves the operational stability of the controller.

*Balance plate assembly*

Figure 3:
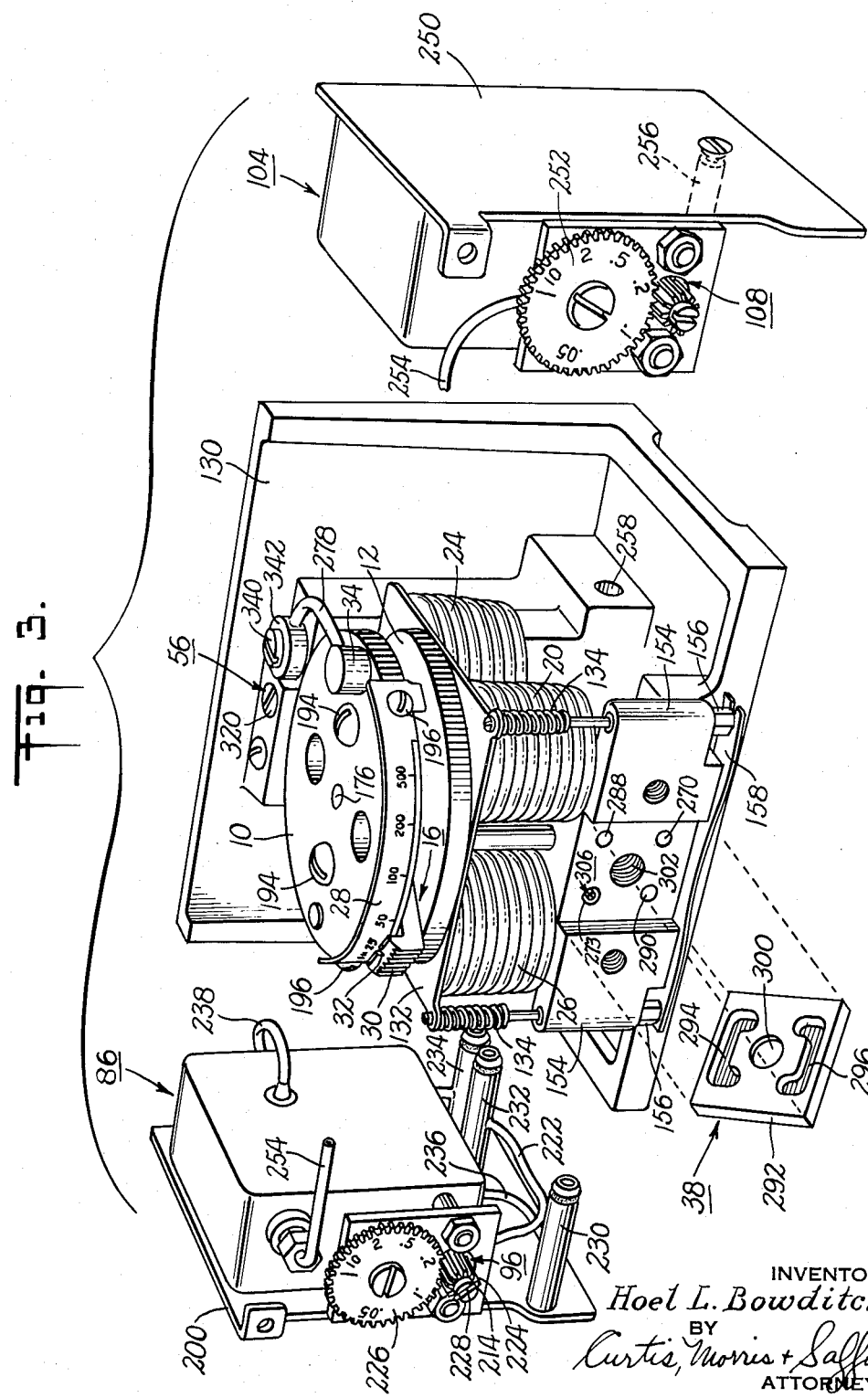
Figure 3 is a perspective view of the central portion of the controller of Figure 1 with parts of the casing broken away, and also shows a detachable derivative tank and a detachable reset tank at the left and right respectively of the central portion of the controller.

The relationship between the parts of the balance plate assembly is best shown in Figure 3 of the drawings. Referring to Figure 3, the controller comprises a main frame or supporting casting 130 on which the bellows 20—26 are mounted. Overlying the bellows there is a square plate 132 to which the balance plate 12 is secured. The front corners of plate 132 are secured to the frame 130 through adjusting springs 134 that will be described in detail hereafter. The thrust plate 10 is mounted in fixed relation to the frame 130 and the rotatable fulcrum 16 is interposed between the balance plate 12 and thrust plate 10 as previously described.

Referring now to Figure 14 of the drawings which shows the mounting of bellows 26, the bellows is provided with a downwardly-extending externally threaded neck 136 which is threaded into the frame 130 to support the bellows thereon. The interior of bellows 26 communicates through neck 136 with a flow passage 138 formed within the frame 130. Secured to top of bellows 26 there is a conical bearing member 140 that passes through a hole 142 of plate 132 and engages a conical recess 144 in the balance plate 12. As shown in Figure 14, the angle of conical recess 144 is greater than the angle of bearing member 140 to insure substantially point contact between the parts when the plate 12 is tilted. The construction and mounting of bellows 20, 22 and 24 are similar to those of bellows 26.

Figure 14 also shows the construction of one of the adjusting springs 134. The upper end of spring 134 is secured by means of a spring adapter 146 and screw 148 to the plate 132. At its lower end spring 134 is connected through a second adapter 150 with a bolt 152 that extends through an arm 154 of the frame 130. As shown in Figure 14, the upper end of bolt 152 is of reduced diameter and is threaded into the adapter 150. At its lower end, bolt 152 has a head 156 that is urged against the bottom of arm 154 by a leaf spring 158.

Figure 4:
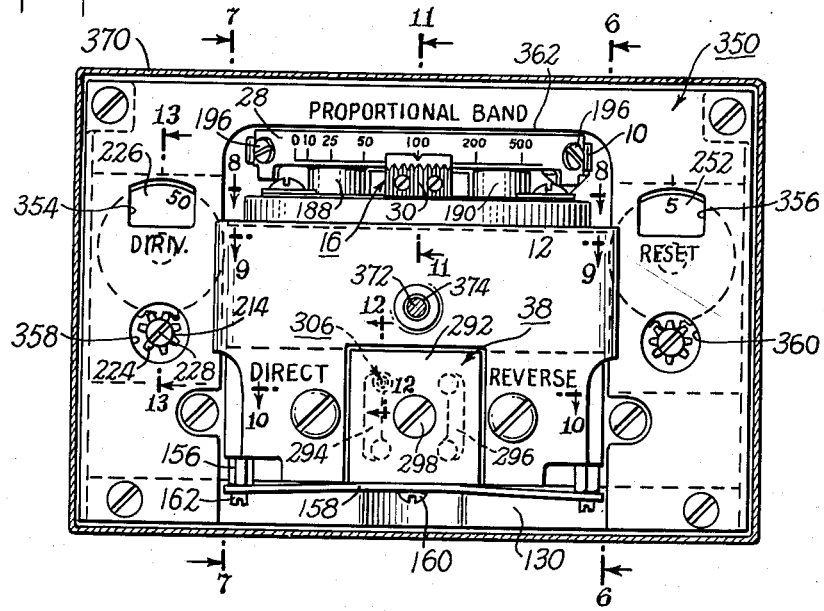
Figure 4 is a general front view of the controller.

Referring now also to Figures 3 and 4, the center of spring 158 is secured to the frame by means of a screw 160 and the ends of the spring are slotted to embrace downwardly projecting portions 162 of the bolt heads 156. The construction is such that the bolts 152 can be rotated to vary the tension of springs 134. The purpose of the adjusting springs 134 is to overcome the effect of slight manufacturing variations in the bellows 20 and 26 and thereby provide a method of obtaining accurate zero adjustment of the controller.

As previously pointed out, the balance plate 12 is supported through a flexure 14 that permits universal tilting movement of the balance plate. Referring now to Figure 8, the flexure 14 is of generally cross-shaped configuration and comprises a pair of arms 164, each of which is secured to the balance plate 12 by a pair of screws 166. As shown in Figures 6 and 7, the screws 166 also serve to connect the balance plate 12 to the square plate 132 previously described. The other arms 168 of the flexure 14 are secured in fixed relation to the frame 130, as will now be described.

Referring to Figure 11 of the drawings, extending up through the center of the balance plate assembly, there is a post 170 that is flanked by two other posts 172 and 174, all of which are secured at their lower ends to the frame 130. The post 170 has at its upper end an extension 176 of reduced diameter that forms with the main portion of the post a shoulder 178 on which the central portion of flexure 14 rests. The arms 168 of the flexure 14 are secured at their outer ends to the posts 172 and 174, respectively, by the cap screws 180. Because of the cross-shaped configuration of flexure 14 and its mode of attachment to the posts 172 and 174 and to the balance plate 12, the balance plate is free to tilt in any direction.

Still referring to Figure 11 and also referring to Figures 16 and 17, the fulcrum 16 is an elongated bar having a central hole through which the extension 176 of post 170 passes in such manner that the extension 176 provides a center of rotation for the fulcrum. Near its outer ends the fulcrum 16 is provided with a pair of rectangular slots 182 within each of which a pair of cylindrical rollers 18 is positioned. As best shown in Figure 17, the portions of the surface of fulcrum bar 16 adjacent to the slots 182 are peened over to retain the rollers 18 within the slots. As shown in Figure 11 the lower roller of each pair rests on the upper surface of balance plate 12. The upper roller of each pair engages the under surface of the thrust plate 10 which is provided with a central hole that engages the extension 176 of post 170. A spring washer 186 is interposed between the thrust plate 10 and fulcrum bar 16 and a common washer 187 is located between bar 16 and flexure 14.

As previously described, the thrust plate 10 is mounted in fixed relation to the frame 130. Referring to Figures 8 and 9 of the drawings, a pair of posts 188 and 190, circumferentially spaced 90° from the posts 172 and 174, respectively, are secured at their lower ends to the frame 130. The posts 188 and 190 extend through holes 192 in the arms 164 of flexure 14 and terminate at a point just above the top of fulcrum bar 16. Thrust plate 10 is secured to the tops of posts 188 and 190 by the cap screws 194 (see Figs. 3 and 5). As shown in Figures 3 and 6, the nozzle 34 is mounted in the thrust plate 10 and its discharge end is positioned close to the upper surface of balance plate 12.

As previously pointed out, the fulcrum bar 16 is rotatable through an angle of approximately 90° to vary the axis around which the balance plate 12 tilts and thereby vary the proportioning band of the controller. As best shown in Figures 1, 3 and 4, a reference scale 28 is secured to the front edge of thrust plate 10 by means of screws 196 and is calibrated in terms of percent proportioning band. The front end of fulcrum bar 16 is provided with an index notch 32 that cooperates with the reference scale to indicate the proportioning band for which the controller is set. When the index mark 32 is in registry with the zero marking on scale 28, the axis of the fulcrum bar 16 is substantially perpendicular to the line interconnecting the bearing points of bellows 20 and 22. Hence, with the parts in this position, a given pressure difference between the bellows 20 and 22 produces a maximum tilting of the balance plate 12, which results in open-shut operation of the controller. As the fulcrum bar is rotated to move index mark 32 toward the upper end of the scale, the moment arms of the bellows 20 and 22 with respect to the axis of the fulcrum bar decrease and hence the tilting tendency of balance plate 12 produced by a given pressure difference between the bellows progressively decreases. When the fulcrum bar has moved approximately 90° from its zero position, the axis of the fulcrum bar becomes parallel with the line interconnecting the bearing points of bellows 20 and 22, and with the parts in this position differential pressures between these two bellows produce no tilting movement of plate 12. Hence under these circumstances the proportioning band is infinite. It will be apparent that intermediate positions of the fulcrum bar 16 give intermediate values of proportioning band.

*Derivative and re-set tanks*

Figure 5:
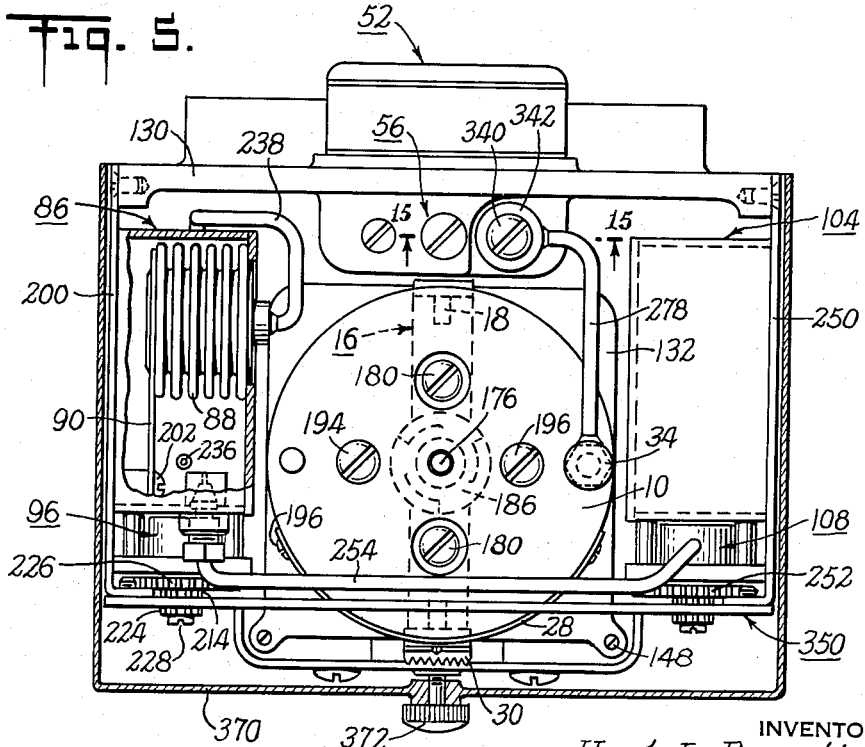
Figure 5 is a top plan view of the controller with the top of the derivative tank broken away to show its interior construction.

The derivative tank is best shown in Figures 3, 5 and 13 of the drawings. As shown in Figure 3, the tank is mounted on a vertical plate 200 that is adapted to be secured to the frame 130 of the controller. Referring to Figure 5, the tank 86 contains the bellows 88 which is secured at its right-hand end to the wall of the tank. The left-hand end of bellows 88 is urged to the right by the leaf spring 90 which, as shown in Figure 13, is secured to the tank wall by screws 202.

As pointed out in connection with the description of Figure 1, the tank 86 is provided with a restrictor valve generally indicated by the numeral 96. Still referring to Figure 13, the valve 96 comprises an internally threaded tubular member 204 secured in the tank wall and having at its inner end a tapered passage 206 that cooperates with a tapered valve member 208. The valve member 208 is urged to the left as shown in Figure 13 by a spring 210 which is connected at its left end to the exterior of tubular member 204 and at its right end to a spring adaptor 212 that engages the right end of valve 208. The passage 206 and valve member 208 have the same taper and the passage 206 constitutes a seat for the valve member 208. Spring 210 tends to urge valve member 208 toward its seat 206, thereby closing the valve.

The valve member 208 is moved to the right to open the valve by means of a valve-actuating member 214 that is threaded into the tube 204. The actuating member 214 has a tubular extension 216 within which the left-hand end of valve member 208 is positioned. Tube 204 has a section of enlarged diameter that cooperates with the extension 216 to define an annular space 218 communicating with the interior of extension 216, and thus with valve seat 206, through a port 220. The annular space 218 is also in communication with a tube 222 through which air is supplied to and withdrawn from the derivative tank. The valve 96 is adjusted to regulate flow of air to and from the derivative tank by rotation of the actuating member 214 which moves the valve member 208 axially against the tension of spring 210.

As shown in Figure 3, the outer end of valve-actuating member 214 is provided with a gear 224 that meshes with a dial gear 226 calibrated to indicate the magnitude of the derivative effect. The front of valve-actuating member 214 is provided with a kerfed head 228 to facilitate adjustment of the valve with a screw driver.

Still referring to Figure 3, secured to the plate 200 near the bottom thereof are a series of three tubular, plug-in type connectors 230, 232 and 234 that are adapted to be inserted in corresponding ports in the frame 130 to provide pneumatic connections between the central portion of the controller and derivative tank 86. The connector 230 is connected to the interior of the derivative tank by a tube 236 (see also Fig. 13). Connector 232 is connected to one end of the tube 222 previously described that leads to restrictor valve 96. Connector 234 is in communication with the interior of bellows 88 through a tube 238. The pneumatic connections to the derivative tank 86 will be further described hereafter.

Still referring to Figure 3 of the drawings, the reset tank 104 is mounted on a plate 250 and provided with a restrictor valve 108 similar in construction to the valve 96 of the derivative tank, and has a dial gear 252 like the gear 226 of the derivative tank but calibrated to indicate the magnitude of the re-set effect. The restrictor valve 108 is supplied with air through a tube 254 which, as shown in Figure 3, is connected to the interior of derivative tank 86 at the upper front side thereof. As previously indicated in connection with the description of Figure 1, the reset tank contains no bellows and is merely a capacity tank. Its interior is connected by a plug-in connector 256 similar to the connectors 230—234 to the interior of bellows 24. The connector 256 is adapted to be inserted in a passage 258 that leads through the frame 130 to the bellows 24.

*The pneumatic system*

The pneumatic relay 52 is mounted on the rear wall of frame 130. The operation of relay 52 has been described in connection with the diagrammatic showing of Figure 1 and since the relay is conventional, the details of its structure are not shown herein.

The pneumatic connections of the controller are best shown in Figures 18 and 19 of the drawings wherein the relay 52 has been omitted to clarify the showing. Referring to the lower portions of Figures 18 and 19, six passages are shown that are identified as 270 to 275, inclusive, and are adapted to be connected to pipes for conducting air under pressure to or from the controller. The air supply pipe for the controller is connected to the lower end of passage 272, and air flows therethrough to the pneumatic relay 52. A portion of the air supplied to the relay flows through a passage 276, the restriction 56, and tube 278, to the nozzle 34. (The flow passages associated with restriction 56 will be further described hereafter.) The pressure in back of nozzle 34 is in communication with the interior of relay 52 through a passage 279. Air exhausted from the relay 52 flows through passage 280 to atmosphere and the regulated output pressure of the relay 52 is delivered to passage 271.

As indicated by a dotted line in Figure 19, the left-hand ends of passages 271 and 274 are interconnected and thus passage 274 as well as branch passages 282 and 284 are maintained at the output pressure of the relay. Referring to Figure 3 as well as to Figure 19, the passages 282 and 284 are adapted to receive the plug-in connectors 234 and 232, respectively, of the derivative tank 86. Thus, when the derivative tank is in operative position, passage 282 communicates with the interior of bellows 88 within the derivative tank, and the passage 284 communicates with restrictor valve 96. As previously described, the interior of the derivative tank 86 outside the bellows 88 is connected to a third connector 230 that is adapted to be introduced into a passage 286 (see Fig. 19) which leads to the interior of bellows 26 of the balance plate assembly. Passages 282 and 284 are connected to the passage 275 which leads to the regulating valve 46 (see Fig. 1).

Still referring to Figure 19, as previously described the bellows 24 communicates with the interior of the re-set tank 104 through a passage 258 and plug-in connector 256 (shown in Fig. 3). The interiors of bellows 20 and 22 are connected by passages 288 and 290, respectively, with the pneumatic switch 38. Also connected to the pneumatic switch 238, are the passages 270 and 273 that are responsive, respectively, to a pressure proportional to the value of the variable condition and to the set-point pressure.

As shown in Figure 3, the passages 270, 273, 288, and 290 extend to the front surface of the frame 130 and are interconnected by a cap 292 having the recesses 294 and 296 formed therein. The cap 292 may be fastened to frame 130 in any suitable way such as by means of a screw 298 (shown in Fig. 4) which passes through the central hole 300 of the cap and is screwed into the internally threaded bore 302 of frame 130. When cap 292 is fastened to the frame in the position indicated in Figure 3, recess 294 interconnects passages 273 and 290 and bellows 22 is thereby made responsive to the set-point pressure. Also recess 296 interconnects passages 270 and 288, thereby making bellows 20 responsive to the measurement pressure. With the cap 292 of the pneumatic switch in this position and for the system illustratively described above, an increase in the measurement pressure tends to produce a closing movement of regulating valve 46. If it is desired to reverse the action of the controller, that is, cause an increase in measurement pressure to produce an opening movement of the valve, the cap 292 of the pneumatic switch 38 is removed, rotated 90° and again fastened to the frame. With cap 292 in the new position, recess 294 interconnects passages 273 and 288 and recess 296 interconnects passages 270 and 290. Hence bellows 20 is responsive to the set-point pressure and bellows 22 is responsive to the measurement pressure. It will be apparent that the pneumatic switch 292 provides a quick and simple method of reversing the pneumatic action of the controller.

*Miscellaneous structural details*

As previously pointed out in the illustrative embodiment described above, the bellows 22 is made responsive to the set-point pressure. It has been found desirable to avoid sudden changes in pressure within the set-point bellows and for this purpose a suitable restriction is positioned in the passage 273. Referring to Figure 12 of the drawings, the passage 273 contains a restriction generally designated 306 and comprising an outer tube 308 having an annular channel 310 containing an O-ring gasket 312 to provide a tight fit with the wall of passage 273. Extending into the outer tube 308 there is an inner tube 314 having a small bore that restricts flow of air therethrough.

Referring now to Figure 15 which shows the internal construction of the restriction 56, a plug 320 having an externally threaded tubular lower end 322 is threaded into a bore 324 in the frame 130. Within the tubular end 322 there is a passage 326 that communicates at its lower end with passage 276 which, as previously described, is connected to the air pressure source. The passage 326 is provided at its lower end with an insert 327 that has a predetermined small diameter to produce a desired pressure drop in the air flowing therethrough. At its upper end, passage 326 communicates with a cross-passage 328 extending through the plug 320. Above and below cross-passage 328 the plug 320 is provided with O-ring gaskets 330 and 332 that cooperate to define a sealed chamber 334 within the bore 324. Chamber 334 communicates with passage 279 that leads to the relay as previously described, as well as with cross-passage 328 and a third passage 336 leading to a second bore 338 in frame 130. Secured in air-tight relation to the upper end of bore 338 by a bolt 340 there is a ring-shaped fitting 342 that is connected to the passage 278 which leads to the nozzle. Thus the pressure of the supply air is reduced as it flows through the lower end of plug 320, and air at reduced pressure then flows through passage 336, bore 338 and passage 278 to the nozzle. The nozzle back pressure is conducted to the relay through passage 279.

As shown in Figures 4 and 5 of the drawings, the controller is provided at its front face with a face plate 350 having a series of apertures therein. Referring particularly to Figure 4, plate 350 has an aperture 354 through which the derivative dial 226 can be viewed and an aperture 356 through which the re-set dial 252 can be viewed. Other apertures 358 and 360 are provided in registry with the restrictor valves 96 and 108, respectively, to permit adjustment of these valves. In the central top portion of the plate 350 there is a relatively large elongated aperture 362 through which the calibrated scale 28 may be viewed and which also permits manual adjustment of the index block 30 of the fulcrum bar 16 to vary the proportioning band of the controller.

Still referring to Figures 4 and 5, extending around three sides and the top of the controller there is a casing 370 that cooperates with frame 130 to provide a closed housing for the controller. Casing 370 is secured to the controller by a threaded knob 372 that may be screwed into a threaded bore 374 in the frame 130.

From the foregoing description it should be apparent that the present invention provides a controller capable of achieving the several objects outlined at the beginning of the present specification. The balance plate assembly with the bellows bearing against a flexure-mounted balance plate and located on opposite sides of a rotatable fulcrum bar provides a structure that is exceptionally shock resistant. Moreover the symmetrical location of the bellows with respect to the balance plate provides a controller that is less affected by changes in ambient temperature than the controllers previously available. Also the controller is readily convertible from one type of action to another. Thus if it is desired to convert the controller illustratively described to a proportioning-plus-reset instrument, it is only necessary to remove the derivative tank 86 and substitute a side plate structure providing for a direct connection between passages 282, 284, 286 and 254. If it is desired to provide a proportioning controller only, reset unit 104 is removed and bellows 24 is replaced by spring 120.

It is, of course, to be understood that the foregoing description is illustrative only and that numerous changes may be made within the scope of the invention. Thus, although the balance plate assembly described above is especially useful in pneumatically-operated instruments, it is not necessarily limited thereto, but may also be used in an electrical or a mechanical instrument. For example, the bellows 20 and 26 of Figure 1 can be replaced by their electrical or mechanical equivalents, e. g., solenoids or springs, and the pneumatic circuit including relay 52 and nozzle 34 can be replaced by a suitable electrical circuit including an electrical amplifier and electrical detecting means for detecting the tilting movement of the balance member. Moreover, it is not necessary that the balance plate assembly be used in a controller, since it would also be useful in, for example, a pneumatic pressure transmitter for transmitting a pneumatic pressure to an indicator, recorder, controller or the like located at a remote point. If it is desired to transmit a signal representative of the value of a differential pressure, the bellows 20 and 22 can be made responsive to the two pressures to measure the desired pressure difference.

The mounting of balance plate 12 by means of flexure 14 is an important feature of the present invention since, as pointed out above, it provides an exceptionally effective way to secure universal tilting movement of the balance member without substantial lateral movement thereof. However, if desired the balance plate can be supported by means of bearings mounted in a gimbal arrangement.

It may also be pointed out that numerous other structural modifications of the pneumatic controller of Figure 1 are possible. Thus the tilting forces exerted on the balance member by the bellows or their equivalent can be either tensile or compressive forces. The discharge end of nozzle 34 can be located adjacent to the under side of balance plate 12, or it can be removed entirely from the balance plate assembly and positioned to cooperate with a baffle that is made mechanically responsive to tilting movement of the balance plate. Also the thrust plate 10 can be eliminated and the fulcrum 16 mounted on a fixed support either above or below the balance plate 12. Numerous other modifications within the scope of the invention will be apparent to those skilled in the art.

What is claimed is:

1. In a force-balance instrument responsive to the value of a measured condition, in combination, a rotatable fulcrum, a balance member tiltable about said fulcrum, a detecting member mounted for effective cooperation with said balance member to detect tilting movement thereof, and first and second means positioned to engage spaced points on said balance member to exert tilting forces thereon and effectively responsive respectively to the value of said measured condition and to the tilting of said balance member as detected by said detecting member, said fulcrum being rotatable to vary the axis around which said balance member tilts and having an axis of rotation substantially parallel to the lines of action of the forces exerted by said first and second means, the tilting forces of said first and second means being exerted in opposite directions about the tilting axis of said balance member.

2. An instrument according to claim 1 and wherein said first means comprises a pair of elements bearing against said balance plate to exert oppositely-acting tilting forces thereon, one of said elements being constructed and arranged to exert on said balance member a force proportional to the value of said measured condition.

3. An instrument according to claim 1 and wherein said first means comprises a pair of elements bearing against said balance member on opposite sides of the tilting axis thereof, one of said elements being constructed and arranged to exert on said balance member a force proportional to the value of said measured condition and the other of said elements being constructed and arranged to exert on said balance member a force proportional to the desired value of said measured condition.

4. In a force-balance instrument responsive to the value of a measured condition, in combination, a rotatable fulcrum, a balance member tiltable about said fulcrum, a pneumatic system including a nozzle mounted for effective cooperation with said balance member and a source of air under pressure for supplying air to said nozzle, whereby tilting of said balance member varies the air flow through said nozzle to vary the pressure in said system, and first and second means positioned to engage spaced points on said balance member to exert tilting forces thereon and effectively responsive respectively to the value of said measured condition and to the pressure in said system, said fulcrum being rotatable to vary the axis around which said balance member tilts and having an axis of rotation substantially parallel to the lines of action of the forces exerted by said first and second means, the tilting forces of said first and second means being exerted in opposite directions about the tilting axis of said balance member.

5. In a force-balance instrument responsive to the value of a measured condition, in combination, a thrust member, a balance member confronting said thrust member and tiltable with respect thereto, a fulcrum interposed between said thrust and balance members and rotatable to vary the axis around which said balance member tilts with respect to said thrust member, a pneumatic system including a nozzle mounted for effective cooperation with said balance member and a source of air under pressure for supplying air to said nozzle, whereby tilting of said balance member varies the air flow through said nozzle to vary the pressure in said system, and first and second means positioned to engage spaced points on said balance member to exert tilting forces thereon and effectively responsive respectively to the value of said measured condition and to the pressure in said system, the tilting forces of said first and second means being exerted in opposite directions about said axis.

6. In a force-balance instrument responsive to the value of a variable measured condition, in combination, a support, a plane flexure member fixed to said support, a balance member secured to said flexure member, whereby said balance member is substantially immovable in its own plane but tiltable about any axis in the plane of said flexure member, a rotatable fulcrum engaging said balance member and rotatable to vary the axis around which said balance member tilts with respect to said support, a detecting member mounted for effective cooperation with said balance member to detect tilting movement thereof, and first and second means positioned to engage spaced points on said balance member to exert tilting forces thereon and effectively responsive respectively to the value of said measured condition and to the tilting of said balance member as detected by said detecting member, the tilting forces of said first and second means being exerted in opposite direction about said axis.

7. In a pneumatically-operated controller for maintaining a variable measured condition substantially at a desired value, in combination, a thrust member, a balance member confronting said thrust member and tiltable with respect thereto, a rotatable fulcrum positioned to engage said balance member and rotatable to vary the axis around which said balance member tilts with respect to said thrust member, a pneumatic system including a nozzle mounted for effective cooperation with said balance member and a source of air under pressure for supplying air to said nozzle, whereby tilting of said balance member varies the air flow through said nozzle to vary the pressure in said system, and first and second means positioned to engage spaced points on said balance member to exert tilting forces thereon and effectively responsive respectively to the departure of said measured condition from said desired value and to the pressure in said system, the tilting forces of said first and second means being exerted in opposite directions about said axis.

8. A controller according to claim 7 and wherein said first means comprises a pair of elements bearing against said balance plate on opposite sides of said axis, one of said elements being constructed and arranged to exert on said balance plate a force proportional to the value of said measured condition and the other of said elements being constructed and arranged to exert on said balance member a force proportional to the value of the set point of said controller.

9. A controller according to claim 8 and wherein both of said elements are bellows responsive to pneumatic pressures proportional respectively to the value of said measured condition and to the value of the set point of said controller.

10. A controller according to claim 8 and wherein one of said elements is a bellows responsive to a pneumatic pressure representative of the value of said measured condition and the other of said elements is an adjustable spring.

11. A controller according to claim 7 and wherein said second means comprises a pair of bellows positioned to bear against said balance member on opposite sides of said axis and responsive through resistances to the pneumatic pressure of said system.

12. A controller according to claim 7 and wherein said second means comprises a bellows directly responsive to the pressure in said pneumatic system and bearing against said balance member on said one side of said axis and an adjustable spring bearing against said balance member on the other side of said axis.

13. In a pneumatically-operated controller for maintaining a variable measured condition substantially at a desired value, in combination, a thrust member, a balance member confronting said thrust member and tiltable with respect thereto, a rotatable fulcrum interposed between said thrust and balance members and rotatable to vary the axis around which said balance member tilts with respect to said thrust member, a nozzle having a discharge end positioned adjacent to one side of said balance member and a pneumatic system including a source of air under pressure for supplying air to said nozzle, whereby tilting of said balance member varies the air flow through said nozzle to vary the pressure in said system, a plurality of elements bearing against said balance member, one of said elements being effectively and yieldably responsive to the value of the measured condition to exert a tilting force on said balance member corresponding with the value of said measured condition; and a second of said elements being yieldably responsive to the pressure in said system to exert a tilting force on said balance member corresponding with the system pressure, whereby a pressure is established in said system that is a function of the value of the measured condition.

14. In a pneumatically-operated controller for maintaining a variable condition substantially at a desired value, in combination, a thrust plate, a tiltable balance plate confronting said thrust plate, a rotatable fulcrum interposed between the thrust and balance plates and rotatable to vary the axis around which said balance plate tilts with respect to said thrust plate, a nozzle having a discharge end positioned adjacent to the side of said balance plate that confronts said thrust plate, and a pneumatic system including a source of air under pressure for supplying air to said nozzle, whereby tilting of said balance plate varies the air flow through said nozzle to vary the pressure in said system, a plurality of elements bearing against the other side of said balance plate, one of said elements being effectively and resiliently responsive to the value of said variable condition to exert a tilting force on said plate corresponding with the value of said condition and a second of said elements being resiliently responsive to the pressure in said system to exert a tilting force on said plate corresponding with the system pressure whereby a pressure is established in said system that is a function of the value of said variable condition.

15. In a pneumatically-operated controller for maintaining a variable condition substantially at a desired value, in combination, a thrust plate, a tiltable balance plate confronting said thrust plate, a rotatable fulcrum interposed between said thrust and balance plates and rotatable to vary the axis around which said balance plate tilts with respect to said thrust plate, a nozzle having a discharge end positioned adjacent to said balance plate, and a pneumatic system including a source of air under pressure for supplying air to said nozzle, whereby tilting of said balance plate varies the air flow to said nozzle to vary the pressure in said system, a group of four elements positioned to bear against spaced points on said balance plate, one of said elements being effectively and resiliently responsive to said variable condition to exert a force on said balance plate corresponding with the value of said condition, a second of said elements being resiliently responsive to the system pressure, and the third and fourth elements being constructed and arranged to exert resilient forces on said balance plate, two of said elements being located on each side of said axis, whereby a pressure is established in said system that is a function of the value of said variable condition.

16. A controller according to claim 15 wherein said third and fourth elements are constructed and arranged to exert resilient forces of substantially constant magnitude on said balance plate.

17. A controller according to claim 15 and wherein said third element is constructed and arranged to exert on said balance plate a force corresponding with said desired value, and said second and fourth elements are resiliently responsive through resistance to said system pressure, the resistance associated with said fourth element being greater than the resistance associated with said second element.

18. A controller according to claim 15 and wherein each of said four elements is an expansible metal bellows.

19. In a pneumatically-operated controller for maintaining a variable condition at a desired value, in combination, a fixed thrust plate, a flexure member mounted in fixed relation to said thrust plate, a balance plate secured to said flexure member, a rotatable fulcrum engaging said balance plate and rotatable to vary the axis around which said balance plate tilts with respect to said thrust plate, a nozzle having a discharge end positioned adjacent to said balance plate, a pneumatic system including a source of air under pressure for supplying air to said nozzle, whereby tilting of said balance plate varies the air flow through said nozzle to vary the pressure in said system, first and second means positioned to bear against spaced points on said balance plate to exert tilting forces thereon and responsive respectively to the departure of said variable condition from said desired value and to the pressure in said system, the tilting forces of said first and second means being exerted in opposite direction about said axis, whereby a pressure is established in said system that is a function of the value of said variable condition.

20. A controller according to claim 19 and wherein said flexure is connected at two diametrically spaced points to said balance plate and effectively connected at two other diametrically spaced points to said thrust plate, the connections of said flexure to said balance plate being circumferentially spaced substantially 90° from the connections of said flexure to said tiltable plate to provide for universal tilting movement of said balance plate.

21. In a pneumatically-operated controller for maintaining a variable condition at a desired value, in combination, a fixed thrust plate, a flexure member mounted at its center in fixed relation to said thrust plate, a balance plate secured to said flexure member, a rotatable fulcrum interposed between said thrust and balance plates and rotatable to vary the axis around which said balance plate tilts with respect to said thrust plate, a pneumatic system including a nozzle mounted between said plates and having a discharge end positioned adjacent to said balance plate, a source of air under pressure for supplying air to said nozzle, and a pneumatic relay responsive to the nozzle back pressure, whereby tilting of said balance plate varies the air flow through said nozzle to cause said relay to vary the pressure in said system, a plurality of elements bearing against the other side of said balance plate, one of said elements being effectively and resiliently responsive to said variable condition to exert a tilting force on said balance plate corresponding with the value of said condition, and a second of said elements being resiliently responsive to the pressure in said system to exert a tilting force on said balance plate corresponding with the system pressure, whereby a pressure is established in said system that is a function of the value of said variable condition.

22. In a pneumatically-operated controller for maintaining a variable condition substantially at a desired value, in combination, a fixed thrust plate, a tiltable balance plate confronting said thrust plate, a rotatable fulcrum against which said balance plate bears, said fulcrum being provided with spaced rollers engaging said balance plate and being rotatable to vary the axis around which said balance plate tilts with respect to said thrust plate, a pneumatic system including a nozzle having a discharge end positioned adjacent to one side of said balance plate, a source of air under pressure for supplying air to said nozzle, and a pneumatic relay responsive to the nozzle back pressure whereby tilting of said balance plate varies the air flow through said nozzle to cause said relay to vary the pressure in said system, a plurality of force-exerting elements bearing against said balance plate, one of said elements being effectively and resiliently responsive to the variable condition to exert a tilting force on said balance plate corresponding with the value of said condition, and a second of said elements being resiliently responsive to the pressure in said system to exert a force on said plate corresponding with the system pressure, whereby a pressure is established in said system that is a function of the value of said variable condition.

23. A controller according to claim 7 and wherein one end of said fulcrum is provided with an index and said thrust plate is provided with a dial calibrated in terms of proportioning band, and said index and dial cooperate to indicate the proportioning band of said controller.

24. In a pneumatically-operated controller for maintaining the value of a variable condition substantially at a desired value, in combination, a thrust member, a balance member confronting said thrust member and tiltable with respect thereto, a rotatable fulcrum interposed between said thrust and balance members and rotatable to vary the axis around which said balance member tilts with respect to said thrust member, a pneumatic system including a nozzle having a discharge end positioned adjacent to one side of said balance member, a source of air under pressure for supplying air to said nozzle, and a pneumatic relay responsive to the nozzle back pressure, whereby tilting of said balance member varies the air flow through said nozzle to cause said relay to vary the pressure in said system, a group of four elements bearing against said balance member, one of said elements being effectively and yieldably responsive to the measured condition to exert a force on said balance member corresponding with the value of said measured condition, a second of said elements being yieldably responsive to a pressure corresponding with the set point of the controller and the third and fourth elements of said group being responsive through resistance to the pressure in said system, the resistance associated with said third element being greater than the resistance associated with said fourth element, whereby a pressure is established in said system that is a function of the value of the measured condition.

25. In a pneumatically-operated controller for maintaining a variable condition substantially at a desired value, in combination, a fixed thrust plate, a flexure mounted in fixed relation to said thrust plate, a balance plate secured to said flexure member, a rotatable fulcrum between said thrust and balance plates, said fulcrum being provided with spaced rollers engaging said two plates and being rotatable to vary the axis around which said balance plate tilts with respect to said thrust plate, a nozzle mounted on said thrust plate and having a discharge end positioned adjacent to one side of said balance plate, a pneumatic system including a source of air under pressure for supplying air to said nozzle, and a pneumatic relay responsive to the nozzle back pressure, whereby tilting of said balance plate varies the air flow through said nozzle to cause said relay to vary the pressure in said system, a group of four bellows positioned to bear against the other side of said balance plate, one of said bellows being effectively and resiliently responsive to the variable condition to exert a tilting force on said balance plate corresponding with the value of said condition, a second of said bellows being resiliently responsive to a pneumatic pressure corresponding with a set point of said controller, the third and fourth bellows having resistances associated therewith through which they are responsive to the pressure in said system and the resistance of said third bellows being greater than the resistance of said fourth bellows, said first and second bellows being located on opposite sides of said axis and said third and fourth bellows being located on opposite sides of said axis, whereby a pressure is established in said system that is a function of the value of said variable condition.

26. A controller according to claim 25 and wherein the bearing points of said first and second bellows on said balance plate are equidistant from said axis and remain equidistant from said axis as said fulcrum is rotated and wherein the bearing points of said third and fourth bellows on said balance plate are equidistant from said axis and remain equidistant from said axis as said fulcrum is rotated, whereby the ratio of the moment arms of the forces exerted by said first and second bellows to the moment arms of the forces exerted by said third and fourth bellows can be varied by rotation of said fulcrum.

27. A controller according to claim 25 and wherein a restriction is operatively associated with said second bellows to restrict the flow of air to and from said second bellows.

28. A controller according to claim 25 and wherein the resistances associated with said third and fourth bellows are variable restrictor valves located respectively in a reset capacity tank and a derivative capacity tank, and said capacity tanks are provided with plug-in connections for ready connection to and detachment from said controller.

29. A controller according to claim 28 and including a pneumatic relay having an output pressure regulated by the back pressure of said nozzle and a bellows mounted within the derivative capacity tank of the controller, said output pressure being connected to both the interior of the derivative tank bellows and through the variable restrictor valve to the interior of the derivative tank outside said bellows, the interior of the derivative tank outside said derivative bellows being directly connected to said fourth bellows.

30. In a pneumatically-operated controller of the type that has a pneumatic system including a relay that regulates the air pressure in said system, a control couple for operating said relay, one element of said couple being effectively responsive to the value of the variable condition, and a pneumatic follow-up device responsive to the system pressure and operatively associated with said control couple, a device for applying a derivative effect to said system pressure comprising, in combination with said pneumatic system, a closed chamber pneumatically connected to said follow-up device, an expansible bellows mounted within said chamber and pneumatically connected to the discharge of said relay and an adjustable restrictor valve interposed between the discharge of said relay and the interior of said chamber outside said bellows.

31. A flexure unit adapted to be used in an instrument, said flexure unit comprising, in combination, a support, a movable plate, and a plane resilient cruciform metal member having two oppositely disposed arms connected to said support and two oppositely disposed arms connected to said movable plate, whereby the plate is substantially immovable in its own plane but is universally tiltable with respect to said support.

32. In a pneumatically-operated controller for maintaining a variable condition substantially at a desired value, in combination, a thrust member, a balance member confronting said thrust member and tiltable with respect thereto, a rotatable fulcrum interposed between said thrust and balance members and rotatable to vary the axis around which said balance member tilts with respect to said thrust member, a pneumatic system including a nozzle having a discharge end positioned adjacent to one side of said balance member, a relay responsive to the pressure in the back of said nozzle and a source of air under pressure for supplying air to said nozzle and relay, whereby tilting of said balance member varies the air flow to said nozzle to cause said relay to vary the pressure in said system, first and second means positioned to bear against spaced points on said balance member to exert tilting forces thereon and effectively responsive respectively to the departure of said measured condition from said desired value and to the pressure in said system, the tilting forces of said first and second means being exerted in opposite directions about said axis and a capacity tank connected to said pneumatic system between said nozzle and said relay to improve the stability of said system.

33. A flexure unit adapted to be used in an instrument, said flexure unit comprising a support, a movable ring, and a plane resilient metal member secured to diametrically opposed portions of said ring and mounted on said support near the center of said ring, said resilient member being capable of either simple bending or torsional bending to provide universal tiltability of said ring.

34. In a force balance instrument responsive to the value of a variable measured condition, in combination, a fixed thrust plate, a movable balance plate, a rotatable fulcrum interposed between said thrust plate and balance plate and having bearing surfaces in contact with said thrust plate and one side of said balance plate whereby said balance plate is tiltable about said fulcrum, and means for exerting against the other side of said balance plate a plurality of spaced parallel tilting forces, said fulcrum being rotatable to vary the axis around which said balance plate tilts and having an axis of rotation substantially parallel to the lines of action of said tilting forces.

35. Apparatus according to claim 34 and wherein rollers are mounted in said fulcrum to provide said bearing surfaces and thereby facilitate rotational adjustment of said fulcrum.

36. In a pneumatically-operated controller for maintaining a variable measured condition substantially at a desired value, in combination, a thrust member, a plane flexure member fixed to said thrust member, a balance member secured to said flexure member and confronting said thrust member, whereby said balance member is substantially immovable in its own plane but tiltable about any axis in the plane of said flexure member, a rotatable fulcrum interposed between said thrust and balance members and rotatable to vary the axis around which said balance member tilts with respect to said thrust member, a pneumatic system including a nozzle having a discharge end positioned adjacent to one side of said balance member and a source of air under pressure for supplying air to said nozzle, whereby tilting of said balance member varies the air flow to said nozzle to vary the pressure in said system, and first and second means positioned to bear against spaced points on said balance member to exert tilting forces thereon and effectively responsive respectively to the departure of said measured condition from said desired value and to the pressure in said system, the tilting forces of said first and second means being exerted in opposite directions about said axis.

References Cited in the file of this patent

UNITED STATES PATENTS

| | | |
|---|---|---|
| 868,757 | Bennett | Oct. 22, 1907 |
| 1,720,389 | Binks | July 9, 1929 |
| 1,988,819 | Stuart | Jan. 22, 1935 |
| 2,298,112 | Edwards | Oct. 6, 1943 |
| 2,360,889 | Philbrick | Oct. 24, 1944 |
| 2,520,468 | Moore | Aug. 29, 1950 |
| 2,586,637 | Fitch | Feb. 19, 1952 |
| 2,635,581 | Karig | Apr. 21, 1953 |
| 2,675,015 | Gorrie | Apr. 13, 1954 |
| 2,675,818 | Gallo | Apr. 20, 1954 |